United States Patent
Gupta et al.

(10) Patent No.: US 11,164,124 B2
(45) Date of Patent: Nov. 2, 2021

(54) TASK ALLOCATION OF AERIAL VEHICLES

(71) Applicant: International Business Machines Corporation, Armonk, NY (US)

(72) Inventors: Manish Gupta, New Delhi (IN); Raghava Reddy Kapu Veera, Bangalore (IN); Hamender Singh, Bangalore (IN); Parvathy Vr, Kerala (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 291 days.

(21) Appl. No.: 16/190,594

(22) Filed: Nov. 14, 2018

(65) Prior Publication Data

US 2020/0151637 A1    May 14, 2020

(51) Int. Cl.
*G06Q 10/06* (2012.01)
*G06Q 10/08* (2012.01)
(Continued)

(52) U.S. Cl.
CPC ..... *G06Q 10/06315* (2013.01); *B64C 39/024* (2013.01); *G05D 1/0027* (2013.01);
(Continued)

(58) Field of Classification Search
CPC ........... G06Q 10/047; G06Q 10/06315; G06Q 10/08345; G06Q 30/08; G05D 1/0027;
(Continued)

(56) References Cited

U.S. PATENT DOCUMENTS

| 7,970,652 | B1 * | 6/2011 | Woolston | G06Q 30/08 |
| | | | | 705/26.1 |
| 2003/0014325 | A1 * | 1/2003 | Biffar | G06Q 50/188 |
| | | | | 705/80 |

(Continued)

FOREIGN PATENT DOCUMENTS

| CN | 102768518 A | 11/2012 |
| CN | 102901498 A | 1/2013 |

(Continued)

OTHER PUBLICATIONS

Chiu, Hsien-Ming, A Methodology For Delivery Operations Planning, University of Maryland, (pp. 2 and 43). (Year: 1990).*

(Continued)

*Primary Examiner* — Emmett K. Walsh
*Assistant Examiner* — Jessie James Shafer
(74) *Attorney, Agent, or Firm* — Robert Shatto, Esq.; Kevin P. Radigan, Esq.; Heslin Rothenberg Farley & Mesiti P.C.

(57) ABSTRACT

The disclosure is directed to an autonomous method for dynamically providing a security policy. A method for task allocation of aerial vehicles includes: generating a spot price for a task to be performed by at least one aerial vehicle; determining an expected time for completion of the task by the at least one aerial vehicle; comparing a received bid to the spot price; and performing the task using the at least one aerial vehicle if the bid is greater than the spot price.

17 Claims, 8 Drawing Sheets

(51) Int. Cl.
*G05D 1/00* (2006.01)
*G06Q 30/08* (2012.01)
*B64C 39/02* (2006.01)

(52) U.S. Cl.
CPC ....... *G06Q 10/08345* (2013.01); *G06Q 30/08* (2013.01); *B64C 2201/128* (2013.01)

(58) Field of Classification Search
CPC .. B64C 39/024; B64C 2201/128; G08G 5/003
USPC ........................................................ 705/335
See application file for complete search history.

(56) References Cited

U.S. PATENT DOCUMENTS

| | | | | |
|---|---|---|---|---|
| 2005/0021346 | A1* | 1/2005 | Nadan | G06Q 10/08 705/37 |
| 2014/0032034 | A1* | 1/2014 | Raptopoulos | G05D 1/0088 701/25 |
| 2014/0254896 | A1 | 9/2014 | Zhou et al. | |
| 2015/0120094 | A1* | 4/2015 | Kimchi | G05D 1/00 701/3 |
| 2015/0278759 | A1 | 10/2015 | Harris et al. | |
| 2016/0180287 | A1 | 6/2016 | Chan et al. | |
| 2019/0103032 | A1* | 4/2019 | Sasaki | G01C 21/20 |
| 2019/0340937 | A1* | 11/2019 | Villa | G08G 5/0043 |
| 2020/0072626 | A1* | 3/2020 | Kumar | B60L 53/66 |

FOREIGN PATENT DOCUMENTS

| | | |
|---|---|---|
| CN | 103226357 A | 7/2013 |
| CN | 104615019 A | 5/2015 |
| CN | 105184092 A | 12/2015 |

OTHER PUBLICATIONS

Cheng, Qiao et al.; "An Auction-based Multiple Constraints Task Allocation Algorithm for Multi-UAV System"; 2016 International Conference on Cybernetics, Robotics and Control; Copyright 2016 IEEE; pp. 5.

Anonymous, "A Method and System for Managing a Fleet of Drones," http://priorart.ip.com/IPCOM/000243855, IP.com Prior Art Database Technical Disclosure, IPCOM000243855D, Oct. 22, 2015, 3 pgs.

Anonymous, "Collaborative Drone Footage Capture Utilizing Predictive Analysis," https://priorart.ip.com/IPCOM/000246021, an IP.com Prior Art Database Technical Disclosure, IPCOM000246021D, Apr. 26, 2016, 7 pgs.

Anonymous, "Method and System for Drone Route Selection and Altitude Based on Payload," http://priorart.ip.com/IPCOM/000243699, IP.com Prior Art Database Technical Disclosure, IPCOM000243699D, Oct. 13, 2015, 4 pgs.

Anonymous, "Secure Drone Package Delivery Port," http://priorart.ip.com/IPCOM/000246083, IP.com Prior Art Database Technical Disclosure, IPCOM00246083D, May 3, 2016, 6 pgs.

Anonymous," Method and System for Dynamic Rerouting of Delivery Drone Based on Dynamic Customer Delivery Location," https://priorart.ip.com/IPCOM/000243701, IP.com Prior Art Database Technical Disclosure, IPCOM000243701D, Oct. 13, 2015, 4 pgs.

Wikpedia, "Automated parking system—Wikipedia," https://en.wikipedia.org/wiki/Automated_parking_system, printed Nov. 26, 2019, 5 pgs.

* cited by examiner

TASK ALLOCATION OF AERIAL VEHICLES

TECHNICAL FIELD

The present invention relates generally to aerial vehicles, and more particularly, to a method and system for task allocation of aerial vehicles with dynamic pricing.

RELATED ART

Aerial vehicle delivery systems have been developed for transporting packages from a pick-up location to a delivery location. However, cost-effective pricing and scheduling methodologies for allocating aerial vehicles to a user request have heretofore not been available.

SUMMARY

A first aspect of the invention is directed to a method for task allocation of aerial vehicles, including: generating a spot price for a task to be performed by at least one aerial vehicle; determining an expected time for completion of the task by the at least one aerial vehicle; comparing a received bid to the spot price; and performing the task using the at least one aerial vehicle if the bid is greater than the spot price.

A second aspect of the invention is directed to a system for task allocation of aerial vehicles, including: a spot price module for generating a spot price for a task to be performed by at least one aerial vehicle in at least one aerial vehicle service area; an expected time to completion (ETC) module for determining an ETC of the task by the at least one aerial vehicle in the at least one aerial vehicle service area; a bidding module for comparing a received bid to the spot price; and a scheduling module for scheduling a fulfillment of the task using the at least one aerial vehicle in the at least one aerial vehicle service area if the bid is greater than the spot price.

A third aspect of the invention is directed to a system for task allocation of aerial vehicles, including: a plurality of aerial vehicles; an aerial vehicle service provider for managing an operation of the plurality of aerial vehicles within at least one aerial vehicle service area; a task allocation system for allocating a bid for a task to be performed by at least one of the plurality of aerial vehicles, the task allocation system including: a spot price module for generating a dynamic spot price for the task; an expected time to completion (ETC) module for determining an ETC of the task; a bidding module for comparing the bid to the spot price; and a scheduling module for scheduling a fulfillment of the task using the at least one of the plurality of aerial vehicles if the bid is greater than the dynamic spot price.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

The present invention relates generally to aerial vehicles, and more particularly, to a method and system for task allocation of aerial vehicles with dynamic pricing (e.g., spot pricing).

Figure 1:
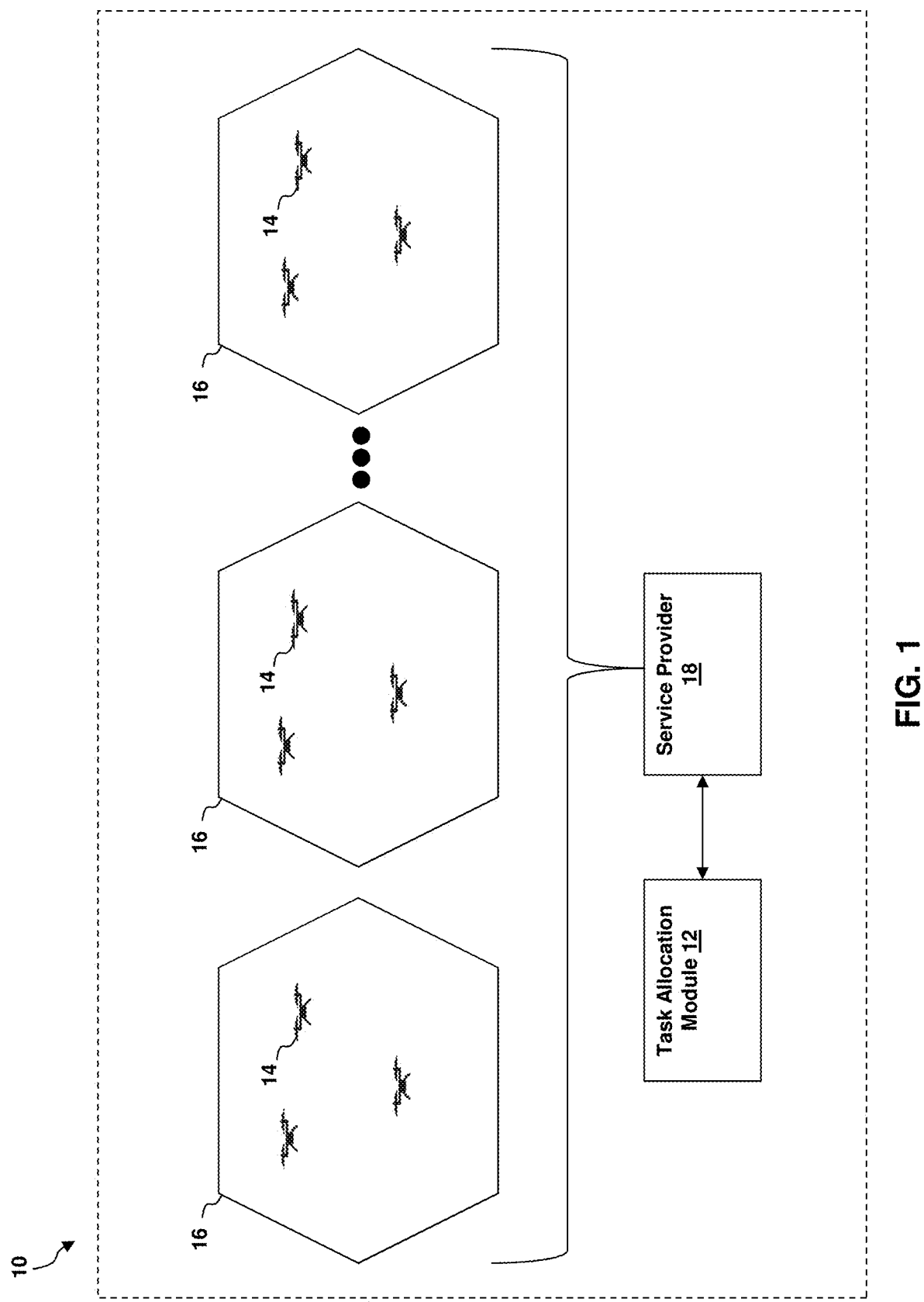
FIG. 1 depicts an overview of an aerial vehicle task allocation system including a task allocation module for the allocation of aerial vehicles based on dynamic pricing according to embodiments.

FIG. 1 depicts an overview of an aerial vehicle task allocation system 10 including a task allocation module 12 for the allocation of aerial vehicles 14 based on dynamic pricing according to embodiments. In general, the aerial vehicle task allocation system 10 includes the task allocation module 12, a plurality of aerial vehicles 14 disposed in one or more aerial vehicle service areas 16, and an aerial vehicle service provider 18 for managing the plurality of aerial vehicles 14 and the aerial vehicle service areas 16 based on the allocation of bids to aerial vehicles 14. According to embodiments, an aerial vehicle 14 may include any type of aerial vehicle that can travel (e.g., under control of an operator or independently) based on pre-programmed travel plans or more complex dynamic automation systems, or be controlled remotely; and can carry a payload. An aerial vehicle 14 has a particular set of capabilities, such as the total weight the aerial vehicle 14 can carry and the total number of packages the aerial vehicle 14 can carry. In general, the more weight an aerial vehicle 14 can carry, the shorter the distance the aerial vehicle 14 can travel before it must be recharged/refueled.

Figure 2:
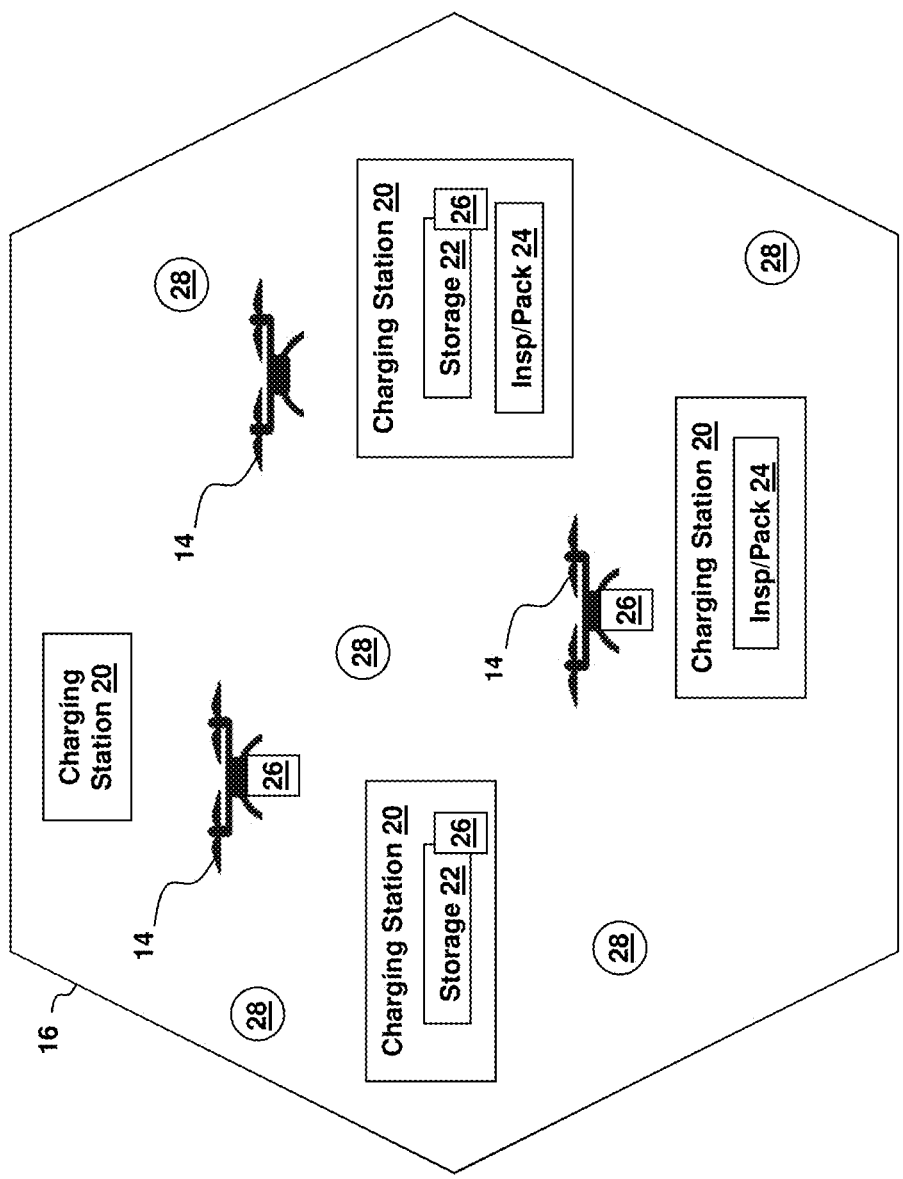
FIG. 2 depicts an example of an aerial vehicle service area according to embodiments.

As shown in greater detail in FIG. 2, each aerial vehicle service area 16 may further include one or more charging stations 20, storage locations 22 (possibly with reordering capability), and inspection/packaging stations 24. A charging station 20 may include a storage location 22 and/or an inspection/packaging station 24, or may be provided as a stand-alone unit. At least one pick-up and/or delivery location 28 may be located within each aerial vehicle service area 16. The pick-up/delivery locations 28 may be static or random (e.g., depending on the location(s) specified by a user 32). In general, a pick-up/delivery location 28 may be disposed at any suitable location within an aerial vehicle service area 16.

As depicted in FIG. 2, the aerial vehicle service area 16 includes a network of charging stations 20, each of which may be associated with one or more storage locations 22 and/or an inspection/packaging stations 24. The charging stations 20 are provided to charge the batteries of the aerial vehicles 14 or replenish the fuel of the aerial vehicle 14, depending on the type(s) of aerial vehicles 14 employed.

The storage locations 22 are provided for the storage of packages 28 dropped off, or picked up by, the aerial vehicles 14 and, if so configured, may have a reordering capability. A storage location 22 with reordering capability may be used by an aerial vehicle 14 to reorder the sequence of packages 28 to be delivered by the aerial vehicle 14. The inspection/packaging stations 24 are provided for the weighing, inspection, and/or wrapping of packages 28. The weight of a package 28 may also be provided by an aerial vehicle 14 that is configured to sense the weight of its payload. At least one pick-up/delivery location 28 may be located within each of the aerial vehicle service areas 16. Each of the components of an aerial vehicle service area 16 will be described in greater detail below.

Many types of requests can be fulfilled by the aerial vehicle task allocation system 10. For example, a user 32 may want to send a package 28 from a location A to a location B. A request may also include a time limit for delivery. For example, an enterprise (e.g., a pizza shop) may request that a package 28 (e.g., a large sausage and onion pizza) be delivered to a specified delivery location within a predetermined time (e.g., 10 minutes). Additional examples may include, inter cilia, a user 32 wishing to use an aerial vehicle 14 to pick-up a camera and take a photo of a given location, a user 32 wishing to track a moving object for a period of time, a user 32 wishing to determine the temperature and other weather-related data by positioning weather instruments at one or more locations for one or more days, etc. Clearly, an endless variety of requests may be fulfilled.

Figure 3:
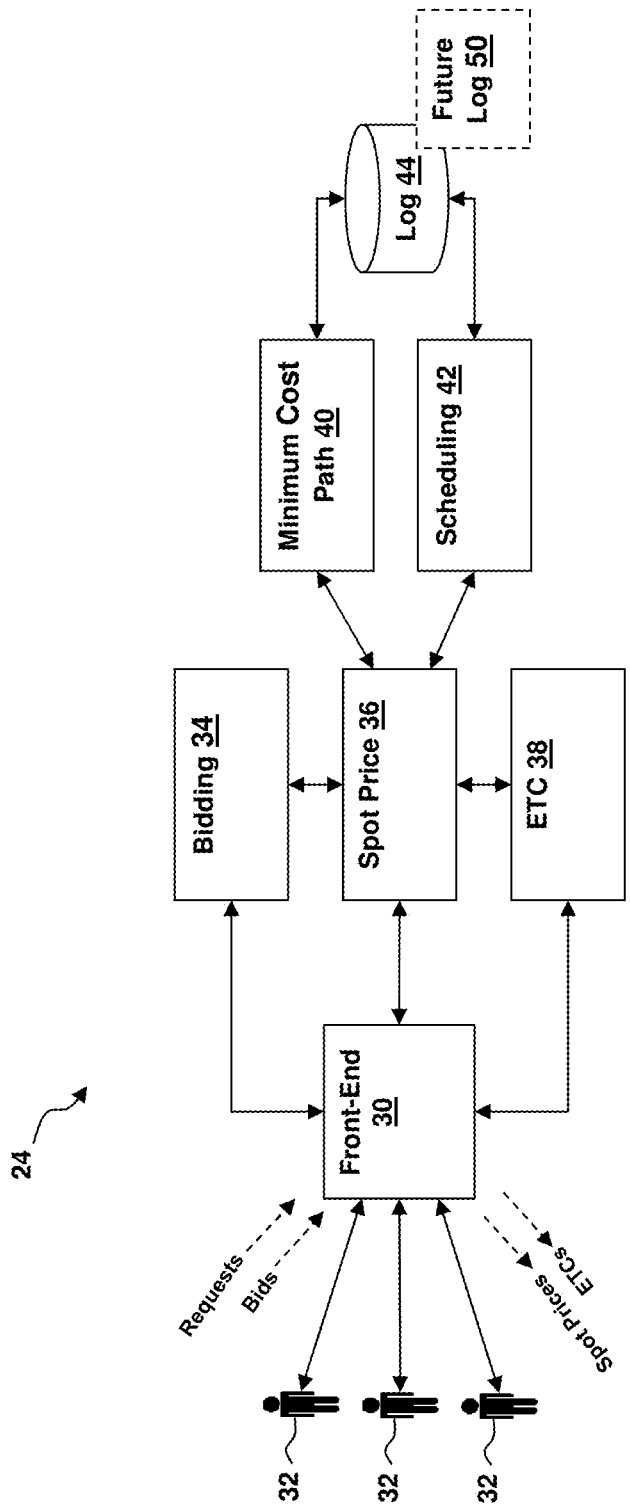
FIG. 3 depicts an example of a task allocation module according to embodiments.

The task allocation module 12 is depicted in greater detail in FIG. 3. The task allocation module 12 according to embodiments includes a front-end module 30 for interacting with one or more users 32. The front-end module 30 is configured, for example, to receive user requests and bids for the pick-up and delivery of packages 28, to provide pricing information to users 32, and to provide other types of relevant information to users 32.

The task allocation module 12 further includes a bidding module 34, a spot price module 36, an ETC (estimated time to completion) module 38, a minimum cost path module 40, a request scheduling module 42, and a data log 44. In general, the modules are configured to receive requests from users 32 for the pick-up and delivery of packages 28, determine minimum cost paths and spot prices, and provide spot prices and estimates of ETC to users 32 based on the requirements of the requests, receive bids from users 32, and allocate bids to aerial vehicle(s) 14 to fulfill requests.

Figure 4:
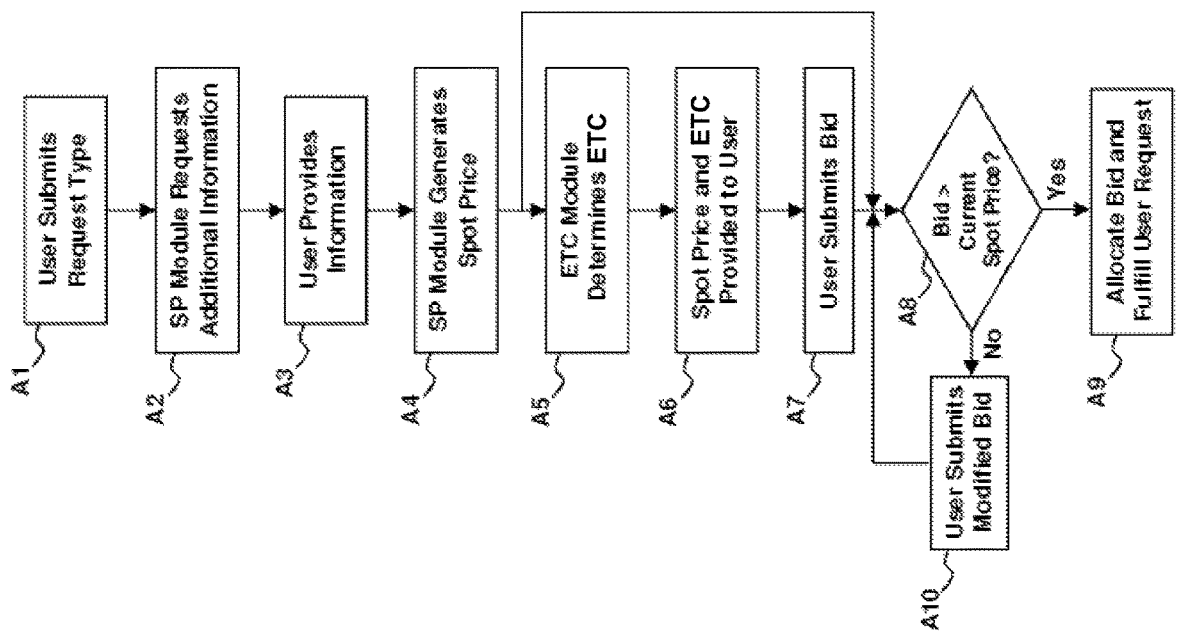
FIG. 4 depicts an illustrative process for task allocation of aerial vehicles according to embodiments.

FIG. 4 depicts an illustrative process for task allocation of aerial vehicles 14 according to embodiments. At process A1, a user 32 submits a request type (e.g., package delivery) to the task allocation module 24 via the front-end module 30. The front-end module 30 may be accessed (e.g., via the Internet) by the user 32 using an application running on a computing device (e.g., a computer, laptop, notebook, pad, mobile phone, etc.) or in any other suitable manner.

In response to the receipt of the request type from the user 32, at process A2, the spot price module 36 requests additional information from the user 32 that will be used to generate a spot price for the request type. For example, for a package delivery request type, the additional information requested from the user 32 by the spot price module 36 may include the pick-up location 28 (e.g., location A) of the package 26, the delivery location 28 (e.g., location B) of the package 26, and the weight of the package 26 (if known). At process A3, the user 32 provides the requested information. After receiving the additional information from the user 32, the spot price module 36 generates at process A4 a spot price for the pick-up and delivery of the package 32 based on the pick-up location 28, delivery location 28, and weight of the package 32, and the aerial vehicles 14 that are currently available to fulfill the request (according to the aerial vehicle service provider 18).

Figure 5:
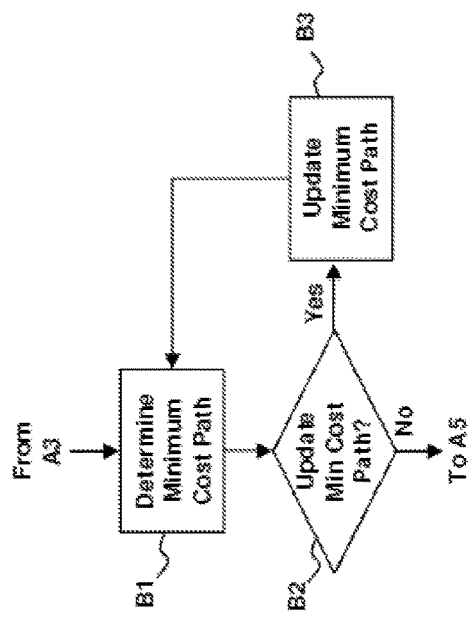
FIG. 5 depicts process A4 of FIG. 4 in greater detail according to embodiments.

Process A4 is depicted in greater detail in FIG. 5. At process B1, the minimum cost path module 40 determines a minimum cost path from the pick-up location 28 (e.g., location A) to the delivery location 28 (e.g., location B) for the given weight of the package 26 and the current workload of aerial vehicles. For example, the minimum cost path from location A to location B may include the path having the lowest total aerial vehicle 14 traversal and inventory costs. In this case, the traversal cost of the aerial vehicle(s) 14 may be based on the predicted battery drain or fuel consumption of the aerial vehicle(s) 14 in fulfilling the request, as well as the inventory cost of storing one or more packages 26 at one or more storage locations 22. Other costs may also be used in determining the minimum cost path. A service fee may be added to the total traversal cost for the minimum cost path by the spot price module 36 to determine the spot price for the request.

According to embodiments, at processes B2 and B3, the minimum cost path determined at process B1 by the minimum cost path module 40 may be continually or periodically updated (e.g., an aerial vehicle 14 or charging station 20 may become unavailable) to reflect a current state of the aerial vehicle task allocation system 10. The spot price module 36 may update the spot price based on the updated minimum path cost to generate an updated (e.g., dynamic) spot price, which is provided to the user 32 along with an estimated time for completion of the request.

Figure 6:
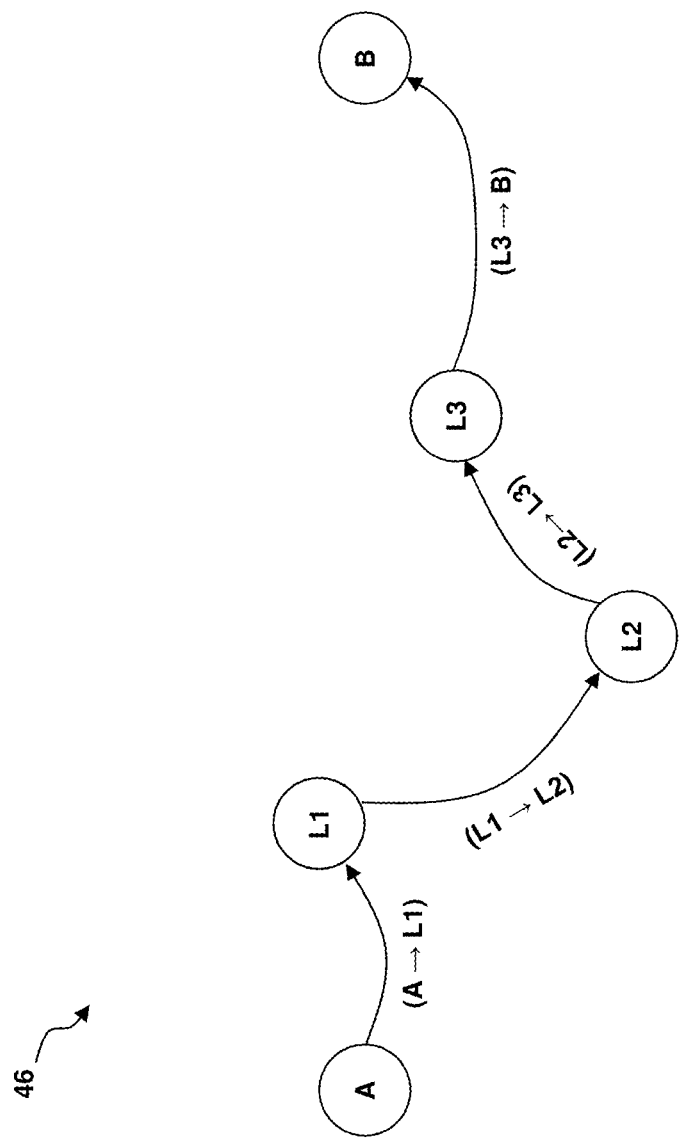
FIG. 6 depicts an example of a minimum cost path determined by the spot price module according to embodiments.

An example of a minimum cost path 46 from location A to location B as determined by the minimum cost path module 40 is depicted in FIG. 6. In this example, the minimum cost path 46 is given by P=(A→L1→L2→L3→B), where L1, L2, L3 are intermediate charging stations 20, each of which may be associated with a storage location 22 and/or inspection/packaging station 24. As can be seen from FIG. 6, the minimum cost path 46 includes a sequence of sub-paths (A→L1), (L1→L2), (L2→L3), and (L3→B), where location A, location B, and charging stations L1, L2, L3 may be located within the same aerial vehicle service area 16 or in different aerial vehicle service areas 16.

Returning to the process for task allocation of aerial vehicle 14 depicted in FIG. 4, at A5, the ETC module 38 receives the minimum cost path generated by the spot price module 36 and determines an estimated time to completion (ETC) for the request submitted by the user 32 based on the minimum cost path. Continuing with the above example with reference to FIG. 6, the ETC module 38 determines the estimated time for completion for the delivery of a package 26 from a pick-up location 28 (e.g., location A) to a delivery location 28 (e.g., location B) along the minimum cost path 46 determined by the minimum cost path module 40. Given the minimum cost path 46 of P=(A→L1), (L1→L2), (L2→L3), and (L3→B), the ETC module 38 estimates (using analytical and/or statistical model(s)) and summates the expected time to traverse each sub-path of P. For example, for the first sub-path (A→L1), the ETC module 38 may estimate the time required for an aerial vehicle 14 allocated to the first sub-path (A→L1) to travel from the pick-up location (location A) to the charging station L1, including any processing time associated with charging station L1 (e.g., charging/fueling, storage/reordering (at a storage location 22), and/or inspection/packaging (at an inspection/packaging station 24)). The processing time may also include the time required for an aerial vehicle 14 to travel to location A prior to pick-up of the package 26. The time to traverse each additional sub-path of P, namely sub-paths (L1→L2), (L2→L3), and (L3→B), may be estimated by the ETC Module 38 in a similar manner. It should be noted that the same aerial vehicle 14 may be used to traverse the entire minimum cost path 46 (with the aerial vehicle 14 charged/fueled as necessary at L1, L2, and/or L3), or different aerial vehicles 14 may be used to traverse one or more of the sub-paths. In the latter case, additional processing time may be required, for example, for the transfer (including any necessary storage) of the package 26 from one aerial vehicle 14 to another aerial vehicle 14.

Again referring to FIG. 4, at A6, the estimated time to completion (ETC) determined by the ETC module 38 and the spot price generated by the spot price module 36 are provided to the user 32 via the front end module 32. At process A7, after reviewing the ETC and spot price for the submitted request, the user 32 may submit a bid via the front-end module 30, which is forwarded to the bidding module 34. The bid may include, for example, the request type (e.g., package delivery), request parameters (e.g., from location A to location B, weight of package), and the price of the bid (e.g., $100). In submitting the bid, the user 32 must keep in mind that the spot price may have been dynamically updated by the spot price module 36 in response to a change in the minimum cost path determined by the minimum cost path module 40.

At process A8, the bidding module 34 obtains the current spot price from the spot price module 36 and compares the current (possibly updated) spot price to the bid submitted by the user 32. If the bid is greater than the current spot price (Yes at A8), then the bid is allocated and the user's request is scheduled by the scheduling module 42 and fulfilled by the aerial vehicle service provider 18 at A9. If not (No at A8), the bid submitted by the user 32 is declined. At this point, the user 32 may submit a modified bid at process A10, and the modified bid is compared at process A8 to the current spot price by the bidding module 34.

In some cases, multiple users 32 may submit bids for a given request. In such a case, the user 32 who submitted the highest bid greater than the current spot price will have that bid allocated by the bidding module 34, and the request will be scheduled by the scheduling module 42 and fulfilled by the aerial vehicle service provider 18. The next highest bid greater than the current spot price will then be allocated, and so on. Any bids lower than the current spot price will not be accepted. A user 32 may modify a unaccepted bid (e.g., increase a bid until higher than the current spot price) in order to have the bid allocated.

In general, once a bid has been allocated, it will be fulfilled. However, in some cases, the dynamic spot price generated by the spot price module 36 may increase such that one or more previously allocated bids are no longer higher than the current spot price. According to embodiments, a previously allocated bid may be compared to the current spot price. If the previously allocated bid is still greater than the current spot price, allocation of the bid continues. However, if the previously allocated bid is now lower than the current spot price, the allocation of the bid may be terminated unless the user 32 submits a new bid that is again higher than the current spot price.

An example of a trajectory of a package 26 from pick-up to delivery will now be described. If a bid submitted by a user 32 to pick-up and deliver a package 26 from location A to location B, respectively, has been allocated, then the package 26 will travel along a trajectory in accordance with the minimum cost path determined by the minimum cost path module 40. As part of the trajectory, an aerial vehicle 14 may be sent to location A to pick up the package. After pick-up, several scenarios are possible. For instance, if the aerial vehicle 14 has enough power/fuel, the next location along the trajectory may be location B, the drop-off location. Alternatively, the aerial vehicle 14 may travel to an inspection/packaging location 24 at some point along the trajectory, where the package 26 may be inspected/wrapped. Inspection may include the weighing of the package 26. If the weight of the package is too great, an extra charge may be added to the bid of the user 32 or the request may be terminated. The trajectory may include a storage location 22, where an aerial vehicle 14 may drop off the package 26 for storage and pick-up at a later time by the same or a different aerial vehicle 14. In some cases, a location along the trajectory may include a charging station 20. An aerial vehicle 14 carrying the package 26 may recharge/refuel at the charging station 20 without dropping off the package 26 before continuing along the trajectory. Alternatively, an aerial vehicle 14 may drop-off the package 26 at the charging station 20. In this case, the package 26 may be subsequently picked-up by a different aerial vehicle 14, which continues along the trajectory toward the drop-off location, location B.

A future log 50 may be stored in the data log 44. According to embodiments, the future log 50 may contain estimates of the future operation of each aerial vehicle 14, derived via a statistical model or a simulation. The future log 50 may include, for example, estimates of where each aerial vehicle 14 may be located and its available capacity at any given time, as well as estimates of the future battery/fuel capacity of each aerial vehicle 14. This information may be used by the minimum cost path module 40 to determine the minimum cost path for a request (e.g., whether a given aerial vehicle 14 can carry an additional package and how far, and more generally, whether an aerial vehicle 14 can carry out a desired task).

When determining the minimum cost path (trajectory), the minimum cost path module 40 may generate a set of options based on the estimates in the future log 50. For example, on receiving a request for pick-up of a package at location A and delivery at location B, the set of options may include: (1) the first aerial vehicle 14 for collecting the package 26 from location A; (2) the location X1 where the first aerial vehicle 14 drops off the package 26; (3) the second aerial vehicle 14 for collecting the package 26 from location X1; (4) the location X2 where the second aerial vehicle 14 drops off the package 26; (5) . . . (n) the last aerial vehicle 14 for collecting the package 26 from location Xn and delivering the package 26 to the location B.

The estimates in the future log 50 can be used to determine which aerial vehicles 14 are available to pick-up the package 26 from location A. An aerial vehicle 14 may be randomly selected from the set of available aerial vehicles 14 to pick-up the package 26. Alternatively, the aerial vehicle 14 in the set of available aerial vehicles 14 located closest to location A may be selected. In general, the trajectory from any point to any other point may be laid out by the aerial vehicle service provider 18, and may be governed by the local operating guidelines for aerial vehicles 14 in the aerial vehicle service areas 16.

According to embodiments, an aerial vehicle 14 may be considered available if it is not serving any bid that is higher than the bid of the current request. If no aerial vehicle 14 is available for a period of time after a package 26 has arrived at a charging location 20 (or storage station 22), then it may have to wait there until another aerial vehicle 14 becomes available. In some cases, if an aerial vehicle 14 can only carry a single package 26, then that aerial vehicle 14 may be assigned to carry the package 26 associated with the highest bid. In general, the package 24 associated with the highest bid may be given priority when assigning aerial vehicles 14. If any bid benefits by sending a package to the destination of a higher/highest bid, then the package may be carried by the aerial vehicle 14 associated with that bid if there is capacity. Many such end-to-end trajectory options are possible and may be generated. For each option a cost is calculated. The cost includes the traversal cost of each aerial vehicle 14 in terms of fuel exhaustion or battery drain due to the request specifically and the inventory cost of storing a package 26 (e.g., at a storage location 22). Other costs are also possible.

Figure 7:
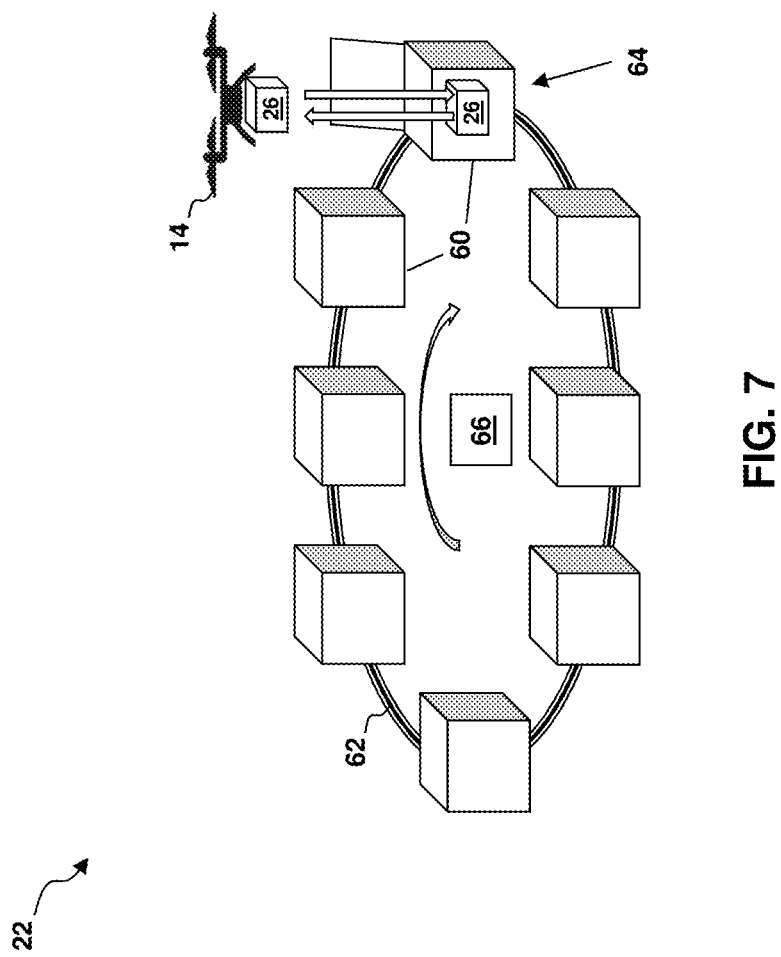
FIG. 7 depicts an example of a storage station with reordering capability according to embodiments.

An example of a storage station 22 with reordering capability according to embodiments is depicted in FIG. 7. As shown, the storage location 22 may include at least one container 60 disposed on a movable conveyor belt 62. Each container 60 is configured to store at least one package 26. An aerial vehicle 14 may deposit a package 26 or pick-up a package 26 into/from a container 60 positioned (and opened) at a drop-off/pick-up location 64. A controller 66 may be configured to selectively rotate the belt 62 as needed to position a particular container 60 at the drop-off/pick-up location 64. Reordering of packages 26 may be provided by selectively rotating the belt 62 to position different containers 60 at the drop-off/pick-up location 64. An aerial vehicle 14 may drop off and/or pick up selected packages 26 into/from the different containers 60 as the containers 60 are rotated along the belt 62.

Figure 8:
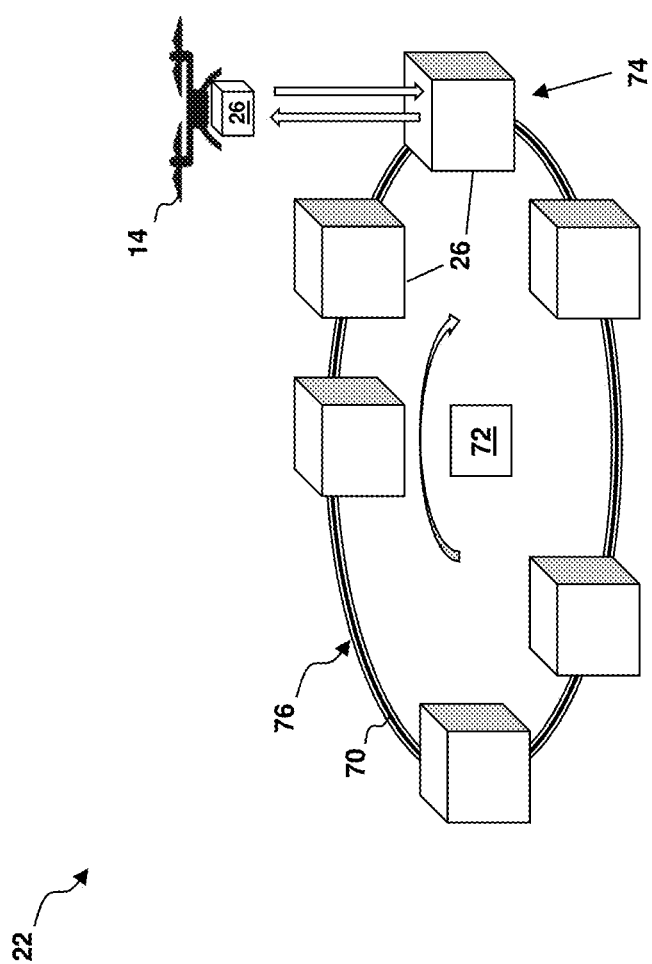
FIG. 8 depicts an additional example of a storage station with reordering capability according to embodiments.

Another example of a storage station 22 with reordering capability according to embodiments is depicted in FIG. 8. As shown, the storage location 22 may include a movable conveyor belt 70. A controller 72 may be configured to rotate the movable conveyor belt 70 to selectively position a package 26 disposed thereon at a drop-off/pick-up location 74 (e.g., for pick-up by an aerial vehicle 14) or to selectively position an open area of the conveyor belt 70 at the drop-off/pick-up location 74 (e.g., to receive a package 26 deposited by an aerial vehicle 14). Reordering of packages 26 may be provided by selectively rotating the belt 70 to position package(s) 26 and/or open area(s) 76 of the belt 70 at the drop-off/pick-up location 74.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

Figure 9:
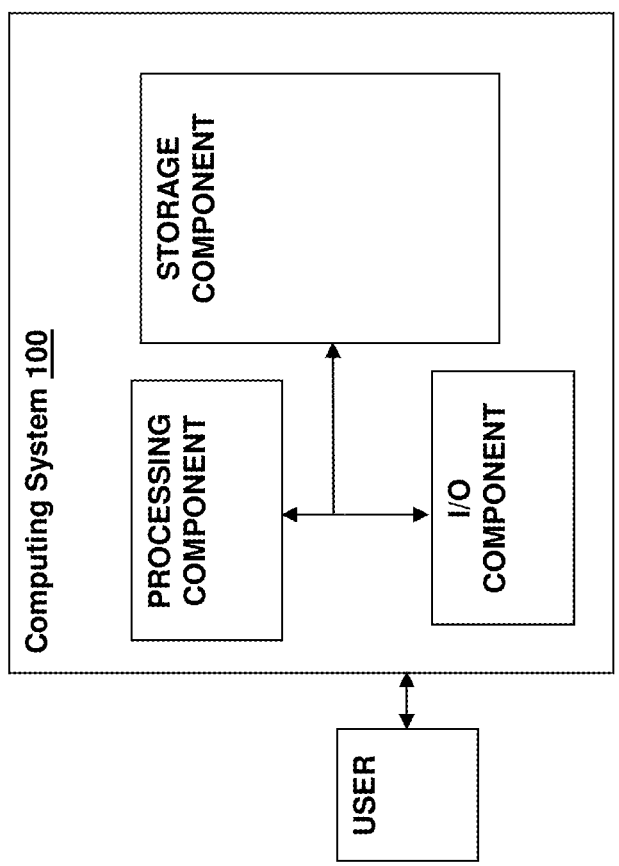
FIG. 9 depicts an illustrative computing environment according to embodiments.

FIG. 9 depicts an illustrative computing system 100 for implementing one or more portions of the present invention, according to embodiments. The computing system 100 may comprise any type and number of computing devices and, for example, may include at least one processor, memory, an input/output (I/O) (e.g., one or more I/O interfaces and/or devices), and a communications pathway. In general, processor(s) execute program code, which is at least partially fixed in memory. While executing program code, processor(s) can process data, which can result in reading and/or writing transformed data from/to memory and/or I/O for further processing. The pathway provides a communications link between each of the components in computing system 100. I/O can comprise one or more human I/O devices, which enable a user to interact with computing system 100.

The various embodiments discussed herein can offer several technical and commercial advantages, some of which are discussed herein by way of example. Embodiments of the present disclosure can eliminate the deficiencies suffered by the reactive network bandwidth balancing techniques employed by the prior art. Furthermore, embodiments of the method discussed herein can be used to automatically balance network bandwidth to minimize the over/under subscribing of network resources.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A computer-implemented method for task allocation of aerial vehicles comprising a processor performing the computer-implemented method for task allocation of aerial vehicles, comprising:
    generating a future log of a plurality of aerial vehicles for delivering packages, wherein the future log comprises:
        an estimated location of each aerial vehicle at a given time;
        an available package capacity of each aerial vehicle at the given time; and a battery capacity of each aerial vehicle;
    determining, using an analytical model and the future log, a minimum cost path for delivering at least one package from a pick-up location to a drop-off location, wherein determining the minimum cost path comprises:
        determining traversal costs by predicting battery consumption of a plurality of aerial vehicles for delivering the at least one package along a plurality of paths between the pick-up location and the drop-off location;
        determining inventory costs for storing the at least one package at one or more storage locations along the plurality of paths; and
        identifying, based on the determined traversal costs and the inventory costs, the minimum cost path between the pick-up location and the drop-off location;
    generating, based in part on the minimum cost path, a spot price for delivery of the at least one package by at least one aerial vehicle in at least one aerial vehicle service area;
    determining an expected time for completion of the delivery of the at least one package by the at least one aerial vehicle in the at least one aerial vehicle service area;
    comparing a received bid to the spot price;
    scheduling a fulfillment of the delivery of the at least one package using the at least one aerial vehicle in the at least one aerial vehicle service area if the bid is greater than the spot price; and sending the at least one aerial vehicle along a trajectory in accordance with the minimum cost path, wherein the at least one aerial vehicle is directed to pick up the at least one package at the pick-up location.

2. The computer-implemented method of claim 1, wherein the minimum cost path includes at least one of a charging station, a storage location, and an inspection/packaging station.

3. The computer-implemented method of claim 2, further comprising reordering a delivery order of the at least one package at the storage location.

4. The computer-implemented method of claim 1, further comprising:
  receiving a request for the delivery of the at least one package from a user;
  providing the user with the spot price for the delivery of the at least one package and the expected time for completion of the delivery; and
  receiving the bid from the user.

5. The computer-implemented method of claim 1, further comprising rejecting the bid if the bid is lower than the spot price.

6. The computer-implemented method of claim 5, further comprising requesting a modified bid in response to the rejecting.

7. The computer-implemented method of claim 1, wherein updating the minimum cost path is performed continuously or periodically.

8. A system for task allocation of aerial vehicles, comprising:
  a processor; and
  a computer-readable storage medium communicatively coupled to the processor and storing program instructions which, when executed by the processor, cause the processor to perform a method comprising:
  generating a future log of a plurality of aerial vehicles for delivering packages,
  wherein the future log comprises:
    an estimated location of each aerial vehicle at a given time;
    an available package capacity of each aerial vehicle at the given time; and a battery capacity of each aerial vehicle;
  determining, using an analytical model and the future log, a minimum cost path for delivering at least one package from a pick-up location to a drop-off location,
  wherein determining the minimum cost path comprises:
    determining traversal costs by predicting battery consumption of the plurality of aerial vehicles for delivering the at least one package along a plurality of paths between the pick-up location and the drop-off location;
    determining inventory costs for storing the at least one package at one or more storage locations along the plurality of paths; and
    identifying, based on the determined traversal costs and the inventory costs, the minimum cost path between the pick-up location and the drop-off location;
  generating, based in part on the minimum cost path, a spot price for delivery of the at least one package by at least one aerial vehicle in at least one aerial vehicle service area;
  determining an expected time to completion of the delivery of the at least one package by the at least one aerial vehicle in the at least one aerial vehicle service area;
  comparing a received bid to the spot price;
  scheduling a fulfillment of the delivery of the at least one package using the at least one aerial vehicle in the at least one aerial vehicle service area if the bid is greater than the spot price; and
  sending the at least one aerial vehicle along a trajectory in accordance with the minimum cost path, wherein the at least one aerial vehicle is directed to pick up the at least one package at the pick-up location.

9. The system for task allocation of claim 8, wherein the spot price is based on the minimum cost path and an availability of the at least one aerial vehicle in the at least one aerial vehicle service area.

10. The system for task allocation of claim 8, wherein the minimum cost path includes at least one of a charging station, a storage location, and an inspection/packaging station.

11. The system for task allocation of claim 10, wherein the storage location includes a reordering system configured to reorder a delivery sequence of the at least one package.

12. The system for task allocation of claim 8, wherein the method performed by the processor further comprises:
  receiving a request for the delivery of the at least one package from a user;
  providing the user with the spot price for the delivery of the at least one package and the expected time for completion of the delivery; and
  receiving the bid from the user.

13. The system for task allocation of claim 8, wherein the method performed by the processor further comprises:
  updating the minimum cost path;
  generating a current spot price for the delivery of the at least one package to be performed by the at least one aerial vehicle based on the updated minimum cost path;
  comparing the received bid to the current spot price; and
  performing the delivery using the at least one aerial vehicle if the bid is greater than the current spot price.

14. The system for task allocation of claim 13, wherein updating the minimum cost path is performed continuously or periodically.

15. A computer program product comprising a computer-readable storage medium having program instructions embodied therewith, the program instructions executable by a processor to cause the processor to perform a method comprising:
  generating a future log of a plurality of aerial vehicles for delivering packages,
  wherein the future log comprises:
    an estimated location of each aerial vehicle at a given time;
    an available package capacity of each aerial vehicle at the given time; and a battery capacity of each aerial vehicle;
  determining, using an analytical model and the future log, a minimum cost path for delivering at least one package from a pick-up location to a drop-off location,
  wherein determining the minimum cost path comprises:
    determining traversal costs by predicting battery consumption of a plurality of aerial vehicles for delivering the at least one package along a plurality of paths between the pick-up location and the drop-off location;
    determining inventory costs for storing the at least one package at one or more storage locations along the plurality of paths; and identifying, based on the determined traversal costs and the inventory costs, the minimum cost path between the pick-up location and the drop-off location;

generating, based in part on the minimum cost path, a spot price for delivery of the at least one package by at least one aerial vehicle in at least one aerial vehicle service area;

determining an expected time for completion of the delivery of the at least one package by the at least one aerial vehicle in the at least one aerial vehicle service area;

comparing a received bid to the spot price;

scheduling a fulfillment of the delivery of the at least one package using the at least one aerial vehicle in the at least one aerial vehicle service area if the bid is greater than the spot price; and sending the at least one aerial vehicle along a trajectory in accordance with the minimum cost path, wherein the at least one aerial vehicle is directed to pick up the at least one package at the pick-up location.

16. The computer-implemented method of claim 1, wherein determining the minimum cost path for delivering the at least one package is further based on a maximum predetermined time threshold for completing the delivery.

17. The computer-implemented method of claim 1, further comprising: allocating, automatically, and based on the minimum cost path, the at least one aerial vehicle to deliver the at least one package in at least one aerial vehicle service area; and balancing, based on the allocating, network resources associated with the plurality of aerial vehicles.

\* \* \* \* \*